(12) United States Patent
Schuermans et al.

(10) Patent No.: US 12,431,755 B2
(45) Date of Patent: Sep. 30, 2025

(54) INSULATION SYSTEM AND METHOD OF INSULATING

(71) Applicant: TOYOTA JIDOSHA KABUSHIKI KAISHA, Aichi-ken (JP)

(72) Inventors: Raf Schuermans, Brussels (BE); Giovanni De Lauri, Brussels (BE); Takahito Endo, Brussels (BE)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 217 days.

(21) Appl. No.: 18/363,741

(22) Filed: Aug. 2, 2023

(65) Prior Publication Data
US 2024/0048014 A1  Feb. 8, 2024

(30) Foreign Application Priority Data
Aug. 5, 2022  (EP) .................................. 22188974

(51) Int. Cl.
*H02K 3/34* (2006.01)
*H02K 15/10* (2006.01)

(52) U.S. Cl.
CPC ............. *H02K 3/34* (2013.01); *H02K 15/105* (2013.01)

(58) Field of Classification Search
CPC ............................. H02K 3/34; H02K 15/105
USPC ......................................................... 310/179
See application file for complete search history.

(56) References Cited

U.S. PATENT DOCUMENTS

| | | | |
|---|---|---|---|
| 6,888,286 B2 | 5/2005 | Howard et al. | |
| 2020/0161917 A1* | 5/2020 | E Silva | H02K 3/24 |
| 2020/0161918 A1* | 5/2020 | Almeida E Silva | H02K 3/345 |
| 2020/0169136 A1* | 5/2020 | Sercombe | H02K 21/16 |
| 2021/0036568 A1* | 2/2021 | Schulz | H02K 3/12 |
| 2021/0367483 A1* | 11/2021 | Yin | H02K 3/34 |
| 2021/0391116 A1 | 12/2021 | Weber | |
| 2022/0021259 A1* | 1/2022 | Almeida E Silva | H02K 9/22 |
| 2022/0311291 A1 | 9/2022 | Eilenberger et al. | |
| 2023/0054794 A1* | 2/2023 | Fatemi | H02K 3/345 |
| 2023/0291258 A1* | 9/2023 | Duan | H02K 1/08 |
| 2024/0006935 A1* | 1/2024 | Blanchard St-Jacques | H02K 3/12 |

FOREIGN PATENT DOCUMENTS

| | | |
|---|---|---|
| DE | 64509 A1 | 11/1968 |
| DE | 102018218963 A1 | 5/2020 |
| DE | 102019125574 A1 | 3/2021 |

(Continued)

*Primary Examiner* — Rashad H Johnson
(74) *Attorney, Agent, or Firm* — HAUPTMAN HAM, LLP

(57) ABSTRACT

An insulation system configured for use in an electric machine includes at least one first insulation section including at least one first insulation element, the first insulation element being configured to be applied to at least a portion of a first winding type of a plurality of windings, and the first insulation element having a first insulation thickness, and at least one second insulation section including at least one second insulation element, the second insulation element being configured to be applied to at least a portion of a second winding type of the plurality of windings, and the second insulation element having a second insulation thickness greater than the first insulation thickness of the first insulation element, wherein the first insulation section is arranged adjacent the second insulation section in a circumferential direction.

14 Claims, 2 Drawing Sheets

(56) References Cited

FOREIGN PATENT DOCUMENTS

WO  2008/044703  A1  4/2008
WO  2020/257840  A1  12/2020

\* cited by examiner

INSULATION SYSTEM AND METHOD OF INSULATING

CROSS-REFERENCE TO RELATED APPLICATION

This application claims priority to European Patent Application No. EP22188974.4 filed on Aug. 5, 2022, incorporated herein by reference in its entirety.

BACKGROUND

1. Technical Field

The present disclosure relates to an insulation system and a method of insulating. Particularly, the present disclosure relates to insulation of components of an electric machine configured for use in an electric vehicle.

2. Description of Related Art

A typical electric vehicle may include an electric motor for propulsion of the electric vehicle. The electric motor may include at least a stator that is fixed within a housing, a rotor surrounded by the stator that is configured to rotate with respect to the stator to provide mechanical power, a field magnet included by one or more of the rotor and the stator that is configured to generate a magnetic field, and an arrangement of conductors, such as windings, included by one or more of the rotor and the stator that is configured to receive and carry electric current, so as to cause the electric current to interact with the magnetic field to create electromagnetic force that rotates the rotor.

Insulation of the conductors of the electric motor improves the ability of the conductors and, thus, the electric motor, to handle heat caused by voltage applied to the conductors. An ability of the conductors to handle heat increases the energy efficiency, reliability, longevity, safety, and/or the like of the conductors and, thus, the electric motor.

An increase in development of more efficient electric motors has led to an increase in an amount of voltage required by the electric motor, which is applied to the conductors of the electric motor. Accordingly, due to the increased amount of voltage required by the electric motor, sufficient insulation of the conductors of the electric motor is paramount to the performance of the electric motor. To this end, a sufficient thickness of insulation surrounding each conductor of the arrangement of conductors of the electric motor is required for optimal insulation of the conductors.

Currently available insulation systems typically apply a uniform and/or constant insulation thickness to the conductors within the arrangement of conductors of the electric motor, regardless of the type of conductor within the arrangement of conductors, which results in an over-insulation of certain conductors within the arrangement of conductors and/or usage of excess insulation material where the insulation material is not needed to the extent it is provided. Over-insulation of the conductors within the arrangement of conductors and/or usage of excess insulation increases costs associated with the manufacture of the arrangement of conductors and, thus, the electric motor, since material used to insulate the conductors is relatively expensive. Additionally, over-insulation of the conductors within the arrangement of conductors and/or usage of excess insulation unduly increases thermal resistance in a thermal path of the conductors, making extraction of heat generated by the conductors more difficult, thereby reducing thermal efficiency of the arrangement of conductors and, thus, the electric motor.

It is desirable to provide an insulation system configured for use in an electric machine, which optimizes usage of an insulation material, thereby enhancing efficiency of the insulation system and, thus, the electric machine.

SUMMARY

According to aspects of the present disclosure, an insulation system configured for use in an electric machine having an axis of rotation and a plurality of windings is provided. The insulation system includes at least one first insulation section including at least one first insulation element, the first insulation element being configured to be applied to at least a portion of a first winding type of the plurality of windings, and the first insulation element having a first insulation thickness, and at least one second insulation section including at least one second insulation element, the second insulation element being configured to be applied to at least a portion of a second winding type of the plurality of windings, and the second insulation element having a second insulation thickness greater than the first insulation thickness of the first insulation element, wherein the first insulation section is arranged adjacent the second insulation section in a circumferential direction.

According to aspects of the disclosure, the first insulation section may not include the second insulation element.

According to aspects of the disclosure, the second insulation section may further include at least one first insulation element.

According to aspects of the disclosure, the second insulation element may be arranged radially-outwardly of the first insulation element in the second insulation section.

According to aspects of the disclosure, the second insulation thickness of the second insulation element may decrease axially.

According to aspects of the disclosure, the second insulation thickness of the second insulation element may decrease as the second insulation element extends away from an electric power source.

According to aspects of the disclosure, the first insulation section may include a plurality of the first insulation elements.

According to aspects of the disclosure, the insulation system according to any aspect disclosed herein may include a plurality of the first insulation sections arranged in the circumferential direction.

According to aspects of the disclosure, the second insulation section may be arranged between at least two first insulation sections of the plurality of first insulation sections.

According to aspects of the disclosure, the insulation system according to any aspect disclosed herein may include a plurality of the second insulation sections arranged in the circumferential direction.

According to aspects of the disclosure, each second insulation section of the plurality of second insulation sections may be spaced apart from an adjacent second insulation section of the plurality of second insulation sections, such that at least one first insulation section is arranged between each second insulation section and the adjacent second insulation section.

According to aspects of the disclosure, the plurality of second insulation sections may include three second insulation sections.

According to aspects of the disclosure, the first insulation element and the second insulation element may each include at least one layer of enamel being configured to be applied to a metal.

According to aspects of the present disclosure, an electric machine is provided. The electric machine includes a stator, a rotor, a plurality of windings, and the insulation system according to any aspect disclosed herein.

According to aspects of the disclosure, a method of insulating a plurality of windings of an electric machine is provided. The method includes applying a first insulation element to at least a portion of a first winding type of the plurality of windings in a first insulation section, the first insulation element having a first insulation thickness, applying a second insulation element to at least a portion of a second winding type of the plurality of windings in a second insulation section, the second insulation element having a second insulation thickness greater than the first insulation thickness of the first insulation element, and arranging the first insulation section adjacent to the second insulation section in a circumferential direction.

In the manner described and according to aspects illustrated herein, the insulation system, the insulation method, and the electric machine including the insulation system are capable of reducing and/or optimizing usage of an insulation material, thereby enhancing efficiency of the insulation system and, thus, the electric machine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
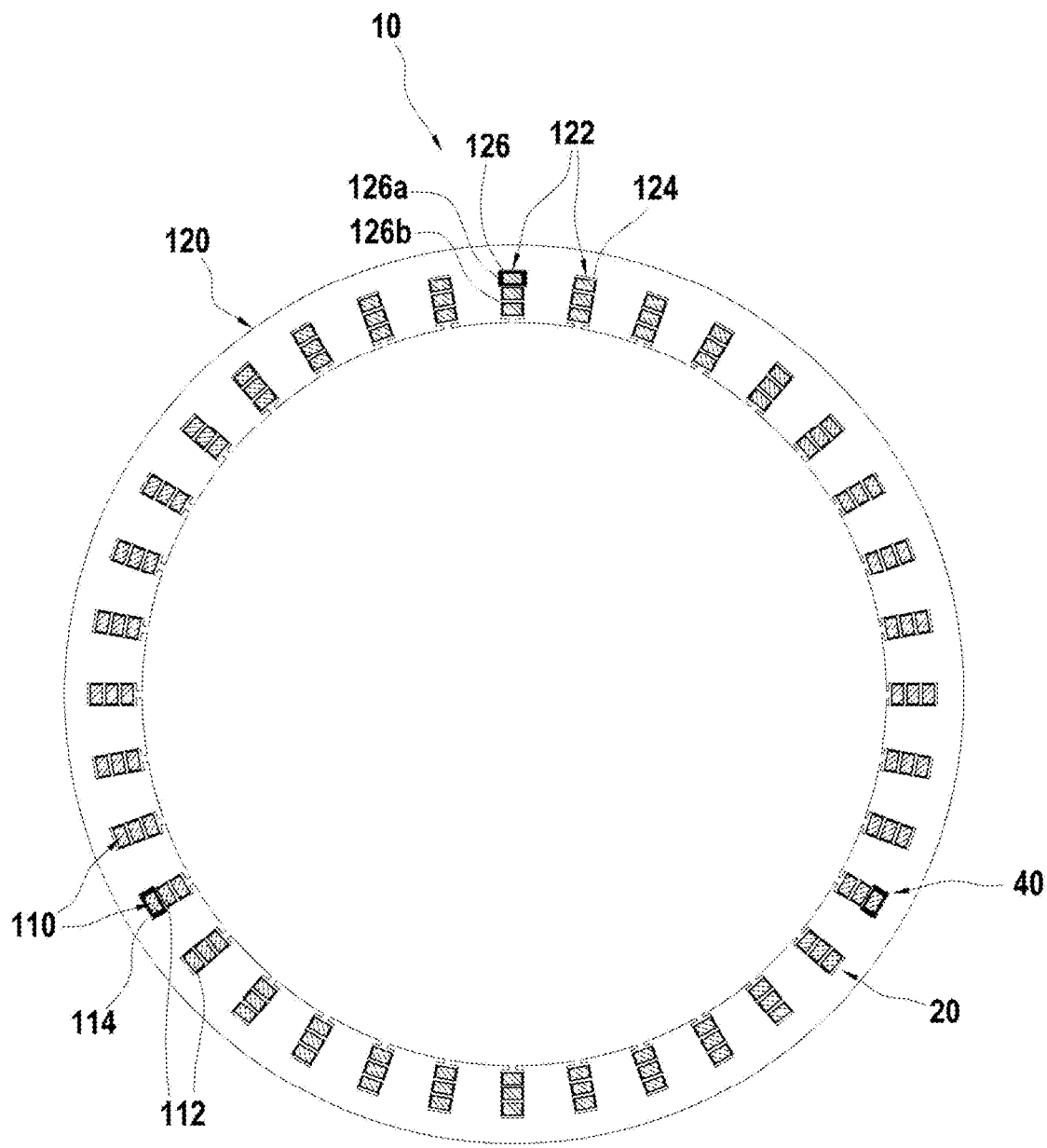
FIG. 1 is a front cross-sectional view of an insulation system according to aspects of the present disclosure.

An embodiment of an insulation system, an electric machine, and a method according to aspects of the disclosure will now be described with reference to FIGS. 1-3. Like numerals represent like parts, and the insulation system and the electric machine will generally be referred to by the reference numeral 10 and 100, respectively. Although the insulation system 10 and the electric machine 100 are described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

As shown in FIG. 4, the insulation system 10 is configured for use in the electric machine 100. In examples, the electric machine 100 is an electric motor configured to provide motive power to an electric vehicle (not shown) in order to propel the electric vehicle. Additionally, in examples, the electric machine 100 includes at least a stator 140 that is supported within a housing 160, a rotor 180 surrounded by the stator 140 that is configured to rotate with respect to the stator 140 about an axis of rotation A R to generate mechanical power, one or more field magnet 190 included by one or more of the stator 140 and the rotor 180 that is configured to generate a magnetic field, and a plurality of windings (also may be referred to herein as "conductors") 110 included by one or more of the stator 140 and the rotor 180 that is configured to receive and carry voltage and/or electric current, so as to cause the electric current to interact with the magnetic field to create electromagnetic force that rotates the rotor 180. It is contemplated that the term "field magnet" as used herein may be understood to be a permanent magnet, an electromagnet, and/or the like.

In examples, the plurality of windings 110 are supported by a cylindrical core member 120 of the electric machine 100. The core member 120 of the electric machine 100 has a circumference and defines a plurality of circumferentially-arranged slots 122 configured to receive the plurality of windings 110. Additionally or alternatively, in examples, the stator 140 may be configured to receive the plurality of windings 110 and the rotor 180 may be configured to receive the one or more field magnet 190. To this end, the stator 140 may include the core member 120 of the electric machine 100. However, it is contemplated that the stator 140 may be configured to receive the one or more field magnet 190 and the rotor 180 may be configured to receive the plurality of windings 110. Accordingly, it is contemplated that the rotor 180 may include the core member 120 of the electric machine 100.

Figure 2:
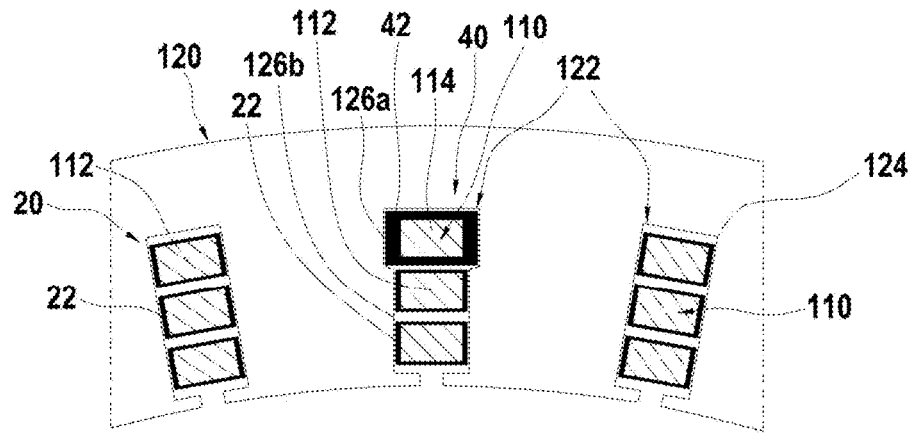
FIG. 2 is an enlarged partial cross-sectional view of the insulation system according to FIG. 1.
Figure 3:
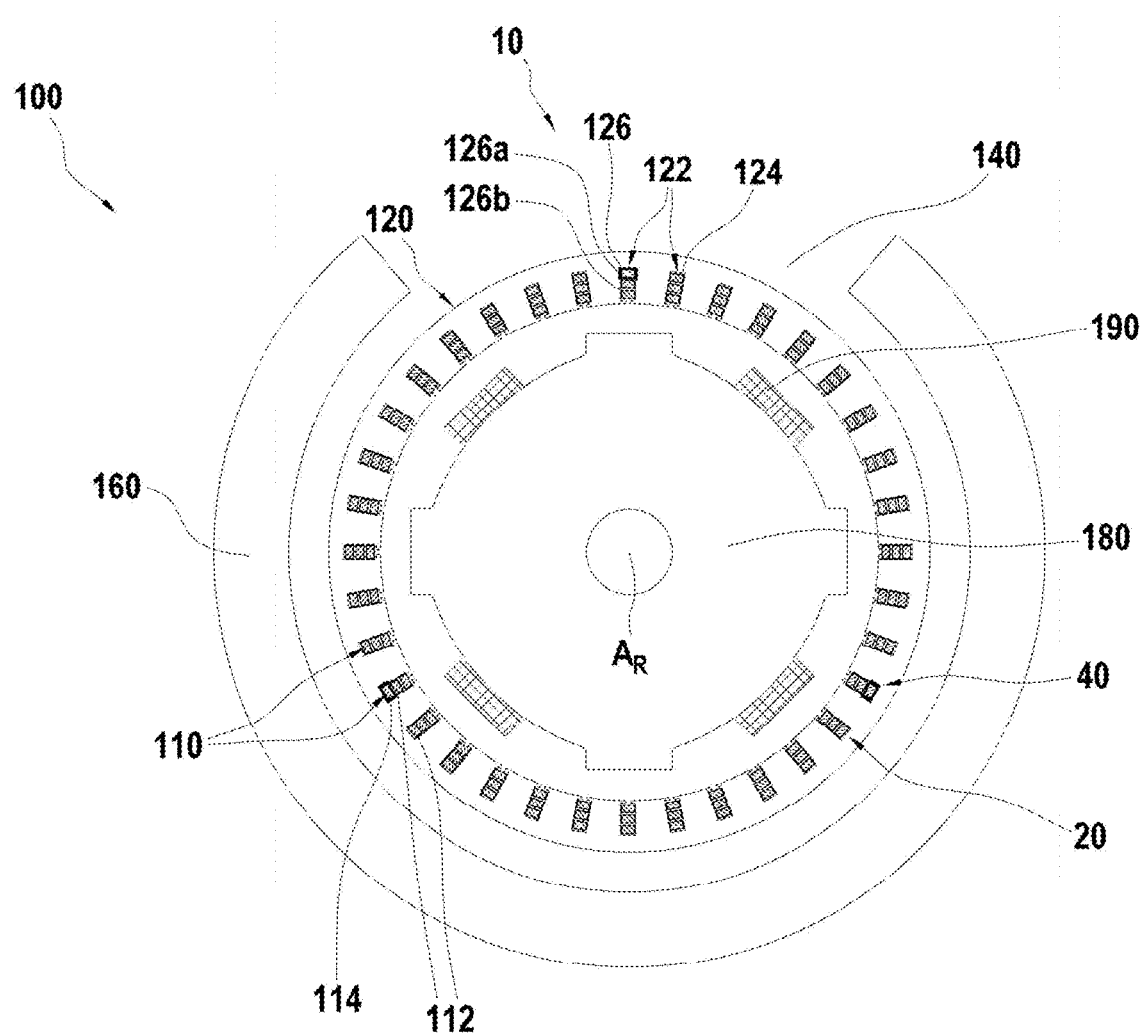
FIG. 3 is a front cross-sectional view of the insulation system according to FIG. 1 included in an electric machine according to aspects of the present disclosure.

Referring to FIGS. 1-3, the plurality of slots 122 of the core member 120 of the electric machine 100 may include a first slot type 124 and a second slot type 126 arranged circumferentially and/or in a circumferential direction. It is contemplated that the term "circumferential" as used herein may be understood as a component, surface, position, region, direction, and/or the like that is arranged and/or extends with respect to the cylindrical shape and/or circumference of the core member 120 of the electric machine 100. In examples, the first slot type 124 is configured to receive one or more winding 112 of the plurality of windings 110 having a first (also referred to herein as "uniform") insulation thickness (i.e. a first winding type 112 and/or a first insulation thickness of a first insulation element 22—discussed further below). To this end, the first slot type 124 may include a uniform shape. In examples, the first slot type 124 is configured to receive more than one winding 112 of the plurality of the windings 110. In examples, the plurality of slots 122 of the core member 120 of the electric machine 100 includes a plurality of slots of the first slot type 124. Additionally, each slot of the first slot type 124 is the same.

The second slot type 126 is configured to receive one or more winding 112, 114 having varied insulation thicknesses (i.e. the first winding type 112 and a second winding type 114 and/or the first insulation thickness of the first insulation element 22 and/or a second insulation thickness of a second insulation element 42—discussed further below). In examples, the second slot type 126 is configured to receive more than one winding 112, 114 of the plurality of the windings 110. To this end, the second slot type 126 may include a stepped shape having a first portion 126a configured to accommodate one or more winding 112 of the plurality of windings 110 having the first insulation thickness (i.e. the first winding type 112 and/or the first insulation element 22) and a second portion 126b configured to accommodate one or more winding 114 having a second insulation thickness greater than the first insulation thickness (i.e. the second winding type 114 and/or the second insulation element 42). Accordingly, the second portion 126b of the second slot type 126 may have a greater clearance than the first portion 124b of the second slot type 126, as well as the first slot type 124. In this manner, the core member 120 is configured accommodate usage of an insulation material that is varied about the core member 120. In examples, the plurality of slots 122 of the core member 120 of the electric machine 100 includes a plurality of slots of the second slot type 126. Additionally, each slot of the second slot type 126 is the same. It is contemplated that an arrangement of the first slot type 124 and the second slot type 126 in the circumferential direction corresponds to an arrangement of a first insulation section 20 and a second insulation section 40 of the insulation system 10, as discussed further below.

The plurality of windings 110 of the electric machine 100 are configured to receive and/or conduct an input of voltage and/or electric current. To this end, each winding 112, 114 of the plurality of windings 110 may be manufactured from copper, aluminum, and or the like. In examples, the plurality of windings 110 includes a first winding type 112 and a second winding type 114. The first winding type 112 includes one or more winding of the plurality of windings 110 that is not supplied with voltage and/or electric current through a connection with an inverter (not shown). The second winding type 114 includes one or more winding of the plurality of windings 110 that is supplied with voltage and/or electric current through a connection with the inverter. Accordingly, at least a portion of each winding of the second winding type 114 generates a greater amount of heat than each winding of the first winding type 112 due to being supplied with voltage and/or electric current through the connection with the inverter. It is contemplated that the inverter is supplied with voltage and/or electric current through a connection with an electric power source (not shown), such as a battery.

Additionally or alternatively, each winding of the second winding type 114 of the plurality of windings 110 may be supplied with voltage and/or electric current through a direct connection with a corresponding busbar (not shown), which is connected to the inverter. It is contemplated that the term "busbar" as referred to herein may be understood as a system of electrical conductors in a generating or receiving station in which power is concentrated for distribution. In examples, the second winding type 114 includes at least two windings of the plurality of windings 110. In particular, the second winding type 114 may include three windings of the plurality of windings 110. However, it is contemplated that more or less windings of the plurality of windings 110 may be included in the second winding type 114. Additionally, it is contemplated that a voltage applied to the second winding type 114 and/or a voltage differential between the second winding type 114 and another element, such as the busbar, the first winding type 112, and/or a corresponding slot 126 of the plurality of slots 122 of the core member 120 of the electric machine 100, is greatest at a point of the connection between the second winding type 114 and the busbar and/or the electric power source and reduces as the second winding type 114 extends away from the electric power source and/or the busbar, due to factors such as ohmic losses attributable to an electric resistance of the plurality of windings 110. Accordingly, it is contemplated that generation of heat is greatest at the point of the connection between the second winding type 114 and the electric power source and/or the busbar and reduces as the second winding type 114 extends away from the electric power source and/or the busbar.

In examples, the plurality of windings 110 are of a hairpin winding type. It is contemplated that the term "hairpin winding" as used herein may be understood to be a solid, flat conductor having a greater relative cross-section (thicker) than a traditional wire winding, thereby capable of having a higher fill factor within a corresponding slot 124, 126 of the plurality of slots 122 of the core member 120 of the electric machine 100. However, it is contemplated that other winding types, such as a traditional wire winding type, may be compatible with the insulation system 10. It is contemplated that the term "traditional wire winding type" as used herein may be understood to be a round wire (coil) having a smaller relative cross-section (thinner), thereby capable of being densely and randomly packed within a corresponding slot 124, 126 of the plurality of slots 122 of the core member 120 of the electric machine 100.

As shown in FIGS. 1-3, the insulation system 10 is configured to optimize usage of an insulation material, by avoiding usage of excess insulation material, thereby enhancing efficiency of the insulation system 10 and, thus, the electric machine 100. It is contemplated that the insulation material may include one or more layer of enamel and/or the like that is configured to be applied to and/or coat a metal, such as each winding 112, 114 of the plurality of windings 110. To avoid usage of excess insulation material, the insulation system 10 includes at least one first insulation section 20 and at least one second insulation section 40, so as to vary an amount of the insulation material used within the insulation system 10 and, thus, the electric machine 100. In examples, the insulation system 10 includes a plurality of first insulation sections 20 and a plurality of second insulation sections 40. In particular, the insulation system 10 may include three second insulation sections 40. Additionally or alternatively, the insulation system 10 may include a greater amount of first insulation sections 20 than second insulation sections 40, which reduces an amount of insulation material used. Further, it is contemplated that each first insulation section 20 is the same and each second insulation section 40 is the same.

Referring to FIG. 2, the first insulation section 20 corresponds to the first winding type 112 of the plurality of windings 110 and/or includes insulation of the first winding type 112. In particular, the first insulation section 20 does not correspond to the second winding type 114 of the plurality of windings 110 and/or does not include insulation of the second winding type 114. Additionally or alternatively, the first insulation section 20 may correspond to the first slot type 124 of the plurality of slots 122 of the core member 120 of the electric machine 100. The first insulation section 20 includes usage of a first insulation element 22 configured to be applied to at least a portion of a corresponding winding of the first winding type 112. In examples, the first insulation section 20 includes a plurality of first insulation elements 22, each applied to a corresponding winding of the first winding type 112.

Referring to FIG. 2, the second insulation section 40 corresponds to the second winding type 114 of the plurality of windings 110 and/or insulation of the second winding type 114. Additionally or alternatively, the second insulation section 40 may correspond to the second slot type 126 of the plurality of slots 110 of the core member 120 of the electric machine 100. The second insulation section 40 includes usage of a second insulation element 42 configured to be applied to at least a portion of a corresponding winding of the second winding type 114. In examples, the second insulation section 40 includes one second insulation element 42 that is applied to a corresponding winding of the second winding type 114. Additionally or alternatively, the second insulation section 40 may correspond to the first winding type 112 of the plurality of windings 110 and the second winding type 114 of the plurality of windings 110 and/or insulation of the first winding type 112 and the second winding type 114. To this end, the second insulation section 40 may include usage of the first insulation element 22 configured to be applied to at least a portion of a corresponding winding of the first winding type 112 and the second insulation element 42 configured to be applied to at least a portion of a corresponding winding of the second winding type 114. In examples, the second insulation section 40 may include one second insulation element 42 that is applied to a corresponding winding of the second winding type 114 and a plurality of first insulation elements 22 applied to corresponding windings of the first winding type 112.

In examples, in the second insulation section 40, the second winding type 114 and/or the second insulation element 42 is arranged radially-outwardly of the first winding type 112 and/or the first insulation element 22. It is contemplated that the term "radially" as used herein may be understood as a component, surface, position, region, direction, and/or the like that is arranged and/or extends further toward (inwardly) or away from (outwardly) the axis of rotation A R of the rotor 180 and, thus, the axis of rotation A R of the electric machine 100. By arranging the second winding type 114 and/or the second insulation element 42 radially-outwardly of the first winding type 112 and/or the first insulation element 22, connection of the second winding type 114 to the electric power source and/or the busbar is facilitated.

In examples, the first insulation element 22 includes at least one layer of the insulation material applied to and/or surrounding at least a portion of a corresponding winding of the first winding type 112 of the plurality of windings 110. Additionally, the first insulation element 22 includes a first insulation thickness of the insulation material applied to and/or surrounding at least the portion the corresponding winding of the first winding type 112. The second insulation element 42 includes at least one layer of the insulation material applied to and/or surrounding at least a portion of a corresponding winding of the second winding type 114 of the plurality of windings 110. Additionally, the second insulation element 42 includes a second insulation thickness of the insulation material applied to and/or surrounding at least the portion of the corresponding winding of the second winding type 114. As illustrated by FIG. 2, at least a portion of the second insulation thickness of the second insulation element 42 is greater than the first insulation thickness of the first insulation element 22. In examples, at least a portion of the second insulation thickness of the second insulation element 42 may be within a range of at least 1.5 to 2.5 times thicker than the first insulation thickness of the first insulation element 22. In this manner, with the first insulation element 22 being applied to corresponding windings of the first winding type 112 of the plurality of windings 110 and the second insulation element 42 being applied to corresponding windings of the second winding type 114 of the plurality of windings 110, usage of the insulation material is varied and/or reduced, so as to only include additional insulation material where voltage and/or voltage differential is highest, thereby avoiding usage of excess insulation material.

Referring to FIGS. 1 and 3, the first insulation section 20 and the second insulation section 40 are arranged circumferentially and/or in the circumferential direction. In particular, the first insulation section 20 and the second insulation section 40 are arranged adjacent to each other in the circumferential direction. Additionally or alternatively, the first insulation section 20 and the second insulation section 40 may be arranged sequentially in the circumferential direction. In particular, the first insulation section 20 and the second insulation section 40 may alternate in the circumferential direction, such that each second insulation section 40 is positioned between and/or adjacent at least two first insulation sections 20. Additionally or alternatively, each second insulation section 40 may be spaced apart from an adjacent second insulation section 40, such that at least one first insulation section 20 is arranged between each second insulation section 40 and the adjacent second insulation section 40. Additionally or alternatively, a plurality of first insulation sections 20 may be arranged between each second insulation section 40 and the adjacent second insulation section 40. Additionally or alternatively, each second insulation section 40 and the adjacent second insulation section 40 may be spaced apart from each other such that an angle within a range of 90° to 150° is present between each second insulation section 40 and the adjacent second insulation section 40. In this manner, the second insulation element 42 is only included on the second winding type 114 of the plurality of windings 110, at particular locations about the core member 120 of the electric machine 100, thereby only including additional insulation material where voltage and/or voltage differential is highest, so as to avoid usage of excess insulation material within the insulation system 10 and, thus, the electric machine 100.

In examples, the second insulation thickness of the second insulation element 42 may vary axially and/or as the second insulation element 42 extends away from the electric power source and/or the busbar. It is contemplated that the term "axially" as used herein may be understood as a component, surface, position, region, direction, and/or the like that is arranged and/or extends with respect to the axis of rotation A R of the rotor 180 and, thus, the axis of rotation A R of the electric machine 100. In particular, the second insulation thickness of the second insulation element 42 may decrease axially and/or as the second insulation element 42 extends away from the electric power source and/or the busbar. In this manner, the second insulation thickness and/or the second insulation element 42 applied to the second winding type 114 of the plurality of windings 110 is thickest at a portion of each winding of the second winding type 114 that is closer to the electric power source and/or the busbar, where voltage applied to each winding of the second winding type 114 and/or generation of heat by each winding of the second winding type 114 is highest along each winding of the second winding type 114. Additionally, in this manner, the second insulation thickness and/or the second insulation element 42 applied to each winding of the second winding type 114 of the plurality of windings 110 is thinner at a portion of each winding of the second winding type 114 that is further from the electric power source and/or the busbar, where voltage applied to each winding of the second winding type 114 and/or generation of heat by each winding of the second winding type 114 is lower along each winding of the second winding type 114, as compared the point closer to the electric power source and/or the busbar. As such, an amount of insulation material used corresponds directly to an amount of voltage applied to the plurality of windings 110 and/or an amount of heat generated by the plurality of windings 110.

Accordingly, usage of the insulation material is varied and reduced within the insulation system 10 and, thus, the electric machine 100. In this manner, due to a variation and/or reduction in usage of the insulation material, a cost of manufacture of the electric machine 100 is reduced. Additionally, in this manner, due to a variation and/or reduction in usage of the insulation material, a thermal resistance of the thermal circuit is reduced and dissipation of heat generated in the plurality of windings 110 is optimized. As such, less cooling capability is required from the plurality of windings 110, thereby increasing the efficiency of the electric machine 100.

It is contemplated that the second insulation thickness of the second insulation element 42 may be greater than or equal to the first insulation thickness of the first insulation element 22 at the point that is further from the electric power source and/or the busbar, at which the second insulation thickness of the second insulation element 42 is decreased. Additionally or alternatively, it is contemplated that the decrease in the second insulation thickness of the second insulation element 42 may be abrupt or gradual along the second insulation element 42. An abrupt decrease in the second insulation thickness of the second insulation element 42 facilitates ease of manufacture and/or application of the second insulation element 42 to each winding of the second winding type 114. A gradual decrease in the second insulation thickness of the second insulation element 42 facilitates increased precision of a desired thickness of the second insulation element 42, with respect to correspondence with the amount of voltage applied to the second winding type 114 and/or the amount of heat generated by the second winding type 114.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

What is claimed is:

1. An insulation system configured for use in an electric machine having an axis of rotation and including a plurality of windings, the insulation system comprising:
    at least one first insulation section including at least one first insulation element, the first insulation element being configured to be applied to at least a portion of a first winding type of the plurality of windings, and the first insulation element having a first insulation thickness; and
    at least one second insulation section including at least one second insulation element, the second insulation element being configured to be applied to at least a portion of a second winding type of the plurality of windings, and the second insulation element having a second insulation thickness greater than the first insulation thickness of the first insulation element, wherein the first insulation section is arranged adjacent the second insulation section in a circumferential direction, and the first insulation section does not include the second insulation element.

2. The insulation system according to claim 1, wherein the second insulation section further includes at least one first insulation element.

3. The insulation system according to claim 2, wherein the second insulation element is arranged radially-outwardly of the first insulation element in the second insulation section.

4. The insulation system according to claim 1, wherein the second insulation thickness of the second insulation element decreases axially.

5. The insulation system according to claim 1, wherein the second insulation thickness of the second insulation element decreases as the second insulation element extends away from an electric power source.

6. The insulation system according to claim 1, wherein the first insulation section includes a plurality of the first insulation elements.

7. The insulation system according to claim 1, comprising a plurality of the first insulation sections arranged in the circumferential direction.

8. The insulation system according to claim 7, wherein the second insulation section is arranged between at least two first insulation sections of the plurality of first insulation sections.

9. The insulation system according to claim 1, comprising a plurality of the second insulation sections arranged in the circumferential direction.

10. The insulation system according to claim 9, wherein each second insulation section of the plurality of second insulation sections is spaced apart from an adjacent second insulation section of the plurality of second insulation sections, such that at least one first insulation section is arranged between each second insulation section and the adjacent second insulation section.

11. The insulation system according to claim 9, wherein the plurality of second insulation sections includes three second insulation sections.

12. The insulation system according to claim 1, wherein the first insulation element and the second insulation element each comprise at least one layer of enamel being configured to be applied to a metal.

13. An electric machine, comprising:
a stator;
a rotor;
a plurality of windings; and
an insulation system comprising:
at least one first insulation section including at least one first insulation element, the first insulation element being configured to be applied to at least a portion of a first winding type of the plurality of windings, and the first insulation element having a first insulation thickness; and
at least one second insulation section including at least one second insulation element, the second insulation element being configured to be applied to at least a portion of a second winding type of the plurality of windings, and the second insulation element having a second insulation thickness greater than the first insulation thickness of the first insulation element, wherein
the first insulation section is arranged adjacent the second insulation section in a circumferential direction, and
the first insulation section does not include the second insulation element.

14. A method of insulating a plurality of windings of an electric machine, the method comprising:
applying a first insulation element to at least a portion of a first winding type of the plurality of windings in a first insulation section, the first insulation element having a first insulation thickness;
applying a second insulation element to at least a portion of a second winding type of the plurality of windings in a second insulation section, the second insulation element having a second insulation thickness greater than the first insulation thickness of the first insulation element; and
arranging the first insulation section adjacent to the second insulation section in a circumferential direction, wherein
the first insulation section does not include the second insulation element.

* * * * *